US006677389B2

(12) United States Patent
Fukuda et al.

(10) Patent No.: US 6,677,389 B2
(45) Date of Patent: Jan. 13, 2004

(54) CATIONIZED SILICA DISPERSION

(75) Inventors: Kentaro Fukuda, Shinnanyo (JP);
Kenji Fukunaga, Shinnanyo (JP);
Hiroya Yamashita, Tokuyama (JP)

(73) Assignee: Tokuyama Corporation, Yamaguchi-ken (JP)

( * ) Notice: Subject to any disclaimer, the term of this patent is extended or adjusted under 35 U.S.C. 154(b) by 0 days.

(21) Appl. No.: 10/114,126

(22) Filed: Apr. 3, 2002

(65) Prior Publication Data
US 2002/0169216 A1 Nov. 14, 2002

(30) Foreign Application Priority Data
Apr. 6, 2001 (JP) ........................................ 2001-107905

(51) Int. Cl.[7] .......................... B01F 3/12; C01B 33/141; C09K 3/00
(52) U.S. Cl. ................. 516/84; 106/14.15; 106/287.34; 252/194; 252/389.3; 516/86
(58) Field of Search ................ 516/84, 86; 106/287.34, 106/14.15; 524/815, 847; 252/389.3, 194

(56) References Cited

U.S. PATENT DOCUMENTS

| 2,984,629 | A | * | 5/1961 | Loftman et al. ............... 516/86 |
| 3,415,771 | A | * | 12/1968 | Woodruff ........... 106/287.34 X |
| 3,431,231 | A | | 4/1969 | Darcy et al. |
| 3,455,717 | A | * | 7/1969 | Debus ............... 106/287.34 X |
| 3,455,718 | A | * | 7/1969 | Dithmar et al. ..... 106/287.34 X |
| 3,819,392 | A | * | 6/1974 | Weldes et al. |
| 3,867,304 | A | * | 2/1975 | Mindick et al. ............... 516/84 |
| 3,867,326 | A | | 2/1975 | Rivin et al. |
| 4,314,932 | A | * | 2/1982 | Wakimoto et al. ...... 524/847 X |
| 5,660,622 | A | * | 8/1997 | Nikoloff ................. 106/287.34 |
| 5,885,485 | A | * | 3/1999 | Brekau et al. ............... 252/309 |
| 6,461,422 | B1 | * | 10/2002 | Yang et al. ......... 106/287.34 X |

FOREIGN PATENT DOCUMENTS

| DE | 2 410 014 | 9/1974 |
| EP | 0 573 016 | 12/1993 |
| JP | 9-142827 | 6/1997 |
| JP | 11-192675 | 7/1999 |
| JP | 2000-233478 | 8/2000 |

OTHER PUBLICATIONS

Iler, The Chemistry of Silica, Wiley, New York, pp. 54–56 (1979).
Database WPI Section Ch, Week 199803, Derwent Publications Ltd., London, GB; An 1998–028146 XP002207626 (Abstract JP 09 286927 A (Koei Chem Ind Co Ltd), Nov. 4, 1997.

* cited by examiner

Primary Examiner—Richard D. Lovering
(74) Attorney, Agent, or Firm—Wenderoth, Lind & Ponack, L.L.P.

(57) ABSTRACT

Provided is a cationized silica dispersion prepared by dispersing dry processed silica and a cationic resin in a polar solvent, wherein a concentration of dissolved silicic acid at 25° C. is 200 ppm or less. This cationized silica dispersion does not substantially form coagulated matters when blended with a binder and therefore can advantageously be used for producing a coating composition such as a coating composition for forming a gas barrier layer, a corrosion preventive coating composition and a coating composition for ink jet recording paper.

10 Claims, No Drawings

CATIONIZED SILICA DISPERSION

The present invention relates to a novel cationized silica dispersion prepared by dispersing dry processed silica and a cationic resin in a polar solvent. Specifically, the present invention relates to a cationized silica dispersion useful for producing a coating composition for providing a gas barrier property, a corrosion resistance, a hydrophilic property, a glossiness and a liquid absorbing property. More specifically, the present invention relates to a cationized silica dispersion which inhibits coagulated matters from being produced when mixed with a water soluble resin as a binder in order to produce a coating composition to make it possible to stably produce the coating composition.

A dispersion prepared by dispersing silica in a polar solvent has so far been known as a coating composition useful for providing a coated article with a gas barrier property, a corrosion property and other characteristics. For example, a gas barriering film comprising silica and a polyvinyl alcohol base polymer is proposed in Japanese Patent Application Laid-Open No. 233478/2000.

Further, a gas barrier coating agent comprising a water soluble high polymer and dry processed silica is proposed in Japanese Patent Application Laid-Open No. 192675/1999 as a coating composition useful for obtaining a smooth and highly transparent coating film. However, involved therein is the problem that when above dry processed silica is present in a dispersion in a high concentration, dispersion stability of silica is reduced, and a coating composition produced using such dispersion is difficult to form a coating layer which can provide a prescribed effect.

A dry processed silica dispersion having a high dispersion stability obtained by blending alkali such as sodium hydroxide with a dispersion in which dry processed silica is dispersed to a high degree is proposed in Japanese Patent Application Laid-Open No. 142827/1997 as a dispersion capable of solving the problem described above.

Further, various cationized silica dispersions having an improved dispersion stability obtained by treating dry processed silica dispersions with cationic resins having a cationic group such as a quaternary ammonium salt group.

In producing a coating composition, a water soluble resin such as cellulose derivatives, polyvinyl alcohol, polyvinyl alcohol derivatives, polyalcohols, starches or vinyl base copolymers is usually blended as a binder for providing the coating composition with a coating function. However, when a cationized silica dispersion obtained using dry processed silica as silica is mixed with these binders to produce a coating composition, caused is a phenomenon in which coagulated matters are produced in the resulting coating composition. In particular, in the cases of a cationized silica dispersion obtained using dry processed silica having a high specific surface area and/or a cationized silica dispersion in which dry processed silica is dispersed to a high degree, such coagulated matters as described above have tended to be produced in a large amount. If such coagulated matters are produced, the coating composition is notably reduced in transparency and stability, and this brings about the disadvantage that the product value of a coating layer formed from the above coating composition is markedly damaged. In addition thereto, such coating composition is not fixed in various physical properties and exerts an adverse effect on the coating conditions thereof, so that it is difficult to stably form a coating layer having fixed characteristics.

Accordingly, an object of the present invention is to provide a cationized silica dispersion which is less liable to produce coagulated matters in producing a coating composition by blending with a binder and which can produce a coating composition having a high transparency with good reproducibility, that is, a dispersion prepared by dispersing dry processed silica and a cationic resin in a polar solvent.

Intensive investigations repeated by the present inventors in order to achieve the object described above have resulted in obtaining the knowledges that when using dry processed silica as a silica source for a silica dispersion, obtained is a cationized silica dispersion having a very high concentration of silicic acid (hereinafter referred to merely as dissolved silicic acid) which is dissolved in the form of a silicic acid polymer and low molecular weight polysilicic acid as compared with a case where so-called wet processed silica such as precipitated silica, silica gel and colloidal silica and that when such cationized silica dispersion having a high concentration of dissolved silicic acid is used to produce a coating composition, coagulated matters are liable to be produced in the above coating composition.

Intensive investigations further repeated by the present inventors based on such knowledges have resulted in finding that a reduction in a concentration of dissolved silicic acid contained in the above cationized silica dispersion to a specific value makes it possible to obtain a cationized silica dispersion which does not produce coagulated matters in blending with a binder and which can produce a coating composition having stabilized physical properties with good reproducibility.

Thus, according to the present invention, provided is a cationized silica dispersion prepared by dispersing dry processed silica and a cationic resin in a polar solvent, wherein a concentration of dissolved silicic acid contained in the above dispersion at 25° C. is 200 ppm or less in terms of $SiO_2$.

The dry processed silica used in the present invention is obtained by burning a silane base gas such as silicon tetrachloride in oxyhydrogen flame and is called "fumed silica". In general, available is dry processed silica having a specific surface area falling in a range of 30 to 500 $m^2/g$ which is determined by a BET method, and it can suitably be used in the present invention.

In particular, use of dry processed silica having preferably a specific surface area falling in a range of 50 to 500 $m^2/g$ makes it possible to obtain a coating composition capable of forming a coating layer which is excellent in prescribed characteristics such as transparency.

The dry processed silica used in the present invention has preferably an average primary particle diameter falling in a range of 5 to 60 nm and an average coagulated particle diameter falling in a range of 10 to 1000 nm.

Dry processed silica having an average primary particle diameter of smaller than 5 nm is instable in the dispersion. On the other hand, if using dry processed silica having an average primary particle diameter of larger than 60 nm, the prescribed characteristics such as a transparency of the coating layer are likely to be reduced.

If using dry processed silica having an average coagulated particle diameter of smaller than 10 nm, a viscosity of the cationized silica dispersion is elevated too high, so that it is likely to be less liable to handle. On the other hand, if using dry processed silica having an average coagulated particle diameter of larger than 1000 nm, silica is likely to settle down to be susceptible to phase separation in the cationized silica dispersion or the coating composition. Further, a coating layer formed by the above coating composition is reduced in transparency.

A small amount of so-called wet processed silica such as precipitated silica, silica gel and colloidal silica and an inorganic matter such as silica, alumina, titania and calcium carbonate may be contained in the cationized silica dispersion of the present invention for the purpose of elevating the characteristics of the coating layer, for example, a gas barrier property, a corrosion property, a hydrophilic property, a glossiness and a liquid absorbing property.

In the cationized silica dispersion of the present invention, the dispersion having a light scattering index (hereinafter referred to merely as an n value) controlled to 2.0 or more is particularly excellent in a dispersibility of dry processed silica. Such dry processed silica dispersion can produce a coating composition capable of providing a coating layer which is homogeneous and has a high transparency and therefore is preferred.

The n value described above is an index showing the dispersion state of silica in the dispersion, and this value grows larger as the dispersibility is elevated. In the present invention, the n value is a value measured according to a method described in Journal of Ceramic Society of Japan, 101 [6], 707 to 712 (1993) for diluted dispersion which has silica concentration of 1.5% by weight. To be specific, a commercially available spectrophotometer is used to measure a spectrum of a dispersion in a wavelength ($\lambda$) falling in a range of 460 to 700 nm to thereby determine an absorbance ($\tau$), and then log ($\tau$) is plotted to log ($\lambda$) to determine a gradient ($-n$) of the straight line according to a least square method using the following equation (1):

$$\tau = \alpha \lambda^{-n} \quad (1)$$

wherein $\tau$ represents an absorbance; $\alpha$ represents a constant; $\lambda$ represents a wavelength of light; and n represents a light scattering index.

In the cationized silica dispersion of the present invention, the cationic resin shall not specifically be restricted as long as it is a resin which is dissociated when dissolved in water to show a cationic property, and publicly known cationic resins can be used without specific restrictions. Among them, the resins having primary to tertiary amine groups or a quaternary ammonium salt group can suitably be used. To be specific, given as the examples thereof are polyethleneimine, polyvinylpyridine, polyaminesulfone, polydialkylaminoethyl methacrylate, polydialkylaminoethyl acrylate, polydialkylaminoethylmethacrylamide, polydialkylaminoethylacrylamide, polyepoxyamine, polyamideamine, dicyandiamide-formalin condensation products, dicyandiamidepolyalkyl-polyalkylenepolyamine condensation products, polyvinylamine, polyallylamine, hydrochlorides thereof and the like. Further, polydiallyldimethylammonium chloride and copolymers thereof with acrylamide, polydiallylmethylamine hydrochloride and the like can be given as the examples thereof.

In the cationized silica dispersion of the present invention, the polar solvent shall not specifically be restricted as long as it is a polar solvent in which silica and the cationic resin are readily dispersed. The most preferred polar solvent is water. In addition to water, capable of being suitably used as well are alcohols such as methanol, ethanol and isopropyl alcohol; ethers; and ketones. The mixed solvents of water and the polar solvents described above can be used as well and make it possible to further elevate a dispersibility of dry processed silica.

The cationized silica dispersion of the present invention may contain a small amount of a surfactant and the like in order to elevate a stability and a dispersibility of the silica particles as long as the effects of the present invention are not damaged.

In the present invention, a concentration of silica contained in the cationized silica dispersion falls preferably in a range of 10 to 40% by weight, particularly preferably in a range of 15 to 30% by weight. If the above concentration is higher than 40% by weight, it tends to be difficult to mix silica with the cationic resin. On the other hand, if the above concentration is lower than 10% by weight, a cost required for storing and transporting the above dispersion goes up, and therefore it is disadvantageous from an industrial point of view.

An amount of the cationic resin contained in the cationized silica dispersion is preferably 1 to 50 parts by weight, particularly preferably 3 to 10 parts by weight per 100 parts by weight of the dry processed silica. If an amount of the above cationic resin is smaller than one part by weight per 100 parts by weight of the dry processed silica, a surface charge on the silica particles becomes uneven, and the silica particles tend to be liable to cause firm coagulation. On the other hand, if an amount of the above cationic resin exceeds 50 parts by weight per 100 parts by weight of the dry processed silica, the viscosity is elevated too high, and therefore dispersion treatment becomes difficult in a certain case.

In the present invention, a process for producing the cationized silica dispersion shall not specifically be restricted, and it can suitably be produced according to a process described below.

Dry processed silica can be used in a powdered form or the form of a slurry prepared by dispersing silica in advance in a polar solvent such as water. The cationic resin is used preferably in the form of a solution prepared by dissolving the resin in advance in a polar solvent.

Suited as a dispersing method is a method in which the mixture of the polar solvent, the dry processed silica and the cationic resin is finely dispersed by means of a suitable disperser, for example, a turbine stator type high-speed rotating stirring disperser such as a homogenizer, a colloid mill, a supersonic emulsifier and a high pressure homogenizer. Among the dispersers described above, the high pressure homogenizer can efficiently produce the dry processed silica dispersion having an n value of 2.0 or more in which silica is dispersed to a high extent and therefore is the most advantageous. The typical examples of the high pressure homogenizer described above include "Nanomizer" manufactured by Nanomizer Inc., "Microfluidizer" manufactured by Microfluidics Corporation and "Ultimizer" manufactured by Sugino Machine Ltd.

The cationized silica dispersion having the suited average coagulated particle diameter and n value described above can be obtained with good reproducibility by allowing a mixed solution comprising the polar solvent, the dry processed silica and the cationic resin to countercurrently collide at a treating pressure of 300 $kgf/cm^2$ or more by means of the high pressure homogenizer described above or passing it through an orifice under the condition of a differential pressure of 300 $kgf/cm^2$ or more between the inlet side and the outlet side of the orifice.

A viscosity of the cationized silica dispersion of the present invention obtained according to the process described above is varied according to a specific surface area and a concentration of the dry processed silica and the kind and an addition amount of the cationic resin, and it has usually a viscosity of 50 to 500 mPa·s.

As described above, the present inventors have obtained the knowledge that when dry processed silica is used as a silica source, a concentration of dissolved silicic acid contained in the resulting cationized silica dispersion is very high as compared with a case in which wet processed silica is used, and it usually reaches 300 to 500 ppm. Further, the higher the purity of silica is, the higher the concentration of dissolved silicic acid contained in the above dispersion tends to be. As described above, when the cationized silica dispersion having a high concentration of dissolved silicic acid is used to produce a coating composition, the phenomenon that a large amount of coagulated matters is produced in the resulting coating composition has been observed.

The present invention is characterized by that in order to prevent such coagulated matters from being produced to obtain a coating composition capable of providing a stable coating layer having a high transparency, a concentration of dissolved silicic acid contained in the cationized silica dispersion is reduced to 200 ppm or less at 25° C.

The reason why the lower the concentration of dissolved silicic acid contained in the cationized silica dispersion is, the more the coating composition obtained using the above dispersion is stabilized is uncertain, but it is considered as follows: as described in The Chemistry of Silica, Wiley, New York, 1979, p. 54, a concentration of dissolved silicic acid contained in the silica dispersion is positively correlated with a surface energy of the silica contained in the above silica dispersion. That is, when a concentration of dissolved silicic acid is high, a surface energy of the silica is high. Accordingly, in producing a coating composition using the cationized silica dispersion having a high concentration of dissolved silicic acid and a high reactivity on a silica surface, the above silica is strongly interacted with a binder and the other additives to produce a large amount of coagulated matters in the resulting coating composition.

In the present invention, it is very important for preventing coagulated matters from being produced in producing a coating composition by blending the above cationized silica dispersion with the binder to control a concentration of silicic acid dissolved in the cationized silica dispersion to 200 ppm or less at 25° C.

A concentration of dissolved silicic acid contained in the cationized silica dispersion can be measured by a silicomolybdic acid method described in Journal of Colloid and Interface Science, 75 [1], p, 138 to 148 (1980). In this method, the above dispersion is mixed with molybdic acid under an acid condition, and silicomolybdic acid produced by reacting dissolved silicic acid with molybdic acid is quantitatively determined by an absorptiometric method. However, when measurement is influenced by light scattered due to coagulated silica, the coagulated silica is removed in advance from the solution by centrifugal separation or filtering, and then the measurement described above is carried out.

A process for producing the cationized silica dispersion in which a concentration of dissolved silicic acid is 200 ppm or less shall not specifically be restricted. However, suited is a process in which the cationized silica dispersion obtained by the dispersion method described above is brought into contact with an anion exchange resin.

A hydroxyl group type strong base anion exchange resin or a conjugate base type strong base anion exchange resin which is obtained by treating the above anion exchange resin with a weak acid can suitably be used as the anion exchange resin. The specific examples thereof include ion exchange resins in which a styrene-divinylbenzene is a principal structure and an ion exchange group is a quaternary ammonium group and which has a hydroxide ion, an acetic acid ion, a carbonic acid ion and a phosphoric acid ion as a paired ion for the above quaternary ammonium group.

Ion exchange operation by bringing the cationized silica dispersion into contact with the anion exchange resin is carried out by a publicly known method. Usually carried out are, for example, a method in which the cationized silica dispersion is passed through a layer filled therein with ion exchange resin particles and a method in which the cationized silica dispersion is mixed with ion exchange resin particles in a bath and then the above ion exchange resin particles are separated.

It is effective as well if the cationic resin solution is subjected to the ion exchange operation described above prior to producing the cationized silica dispersion. Accordingly, a method in which the cationic resin solution passing through the ion exchange operation described above is mixed with the polar solvent and the dry processed silica can be employed as a method for obtaining the cationized silica dispersion of the present invention.

A temperature in carrying out the above ion exchange operation shall not specifically be restricted, and in general, the higher temperature elevates the treating efficiency.

The more the amount ion-exchanged by the above ion exchange operation is, the more the concentration of dissolved silicic acid can be reduced. However, if the above ion exchange operation is carried out in excess, a rise in a viscosity of the above dispersion or gelation thereof is brought about in a certain case, and therefore the optimum ion exchange amount is preferably confirmed in advance by an experiment.

A mechanism in which a concentration of dissolved silicic acid contained in the cationized silica dispersion is lowered by the ion exchange operation described above is not clear but there is marked tendency as follows: that is, a large part of the cationic resin contained in the above dispersion has a conjugate base of a strong acid such as a halide ion as a paired ion for a cationic group, and therefore a part or the whole of these paired ions is converted into a conjugate base of a weak acid such as a hydroxide ion or an acetic acid ion by ion exchange, whereby a concentration of dissolved silicic acid can effectively be reduced.

The method for lowering a concentration of dissolved silicic acid contained in the cationized silica dispersion by the ion exchange operation described above makes it possible to stabilize the cationized silica dispersion immediately after production by contact treatment for very short time and therefore is advantageous.

The cationized silica dispersion of the present invention can provide a coating composition capable of providing a coating layer which is excellent in prescribed physical properties such as transparency by blending with a binder regardless of a concentration and a specific surface area of silica and an addition amount and the structure of the cationic resin as long as a concentration of dissolved silicic acid is 200 ppm or less at 25° C.

Thus, according to the present invention, provided is a production process for a cationized silica dispersion characterized by that in dispersing dry processed silica and a cationic resin in a polar solvent to produce a cationized silica dispersion, a concentration of dissolved silicic acid at 25° C. contained in the cationized silica dispersion is measured and controlled to 200 ppm or less in terms of $SiO_2$.

The cationized silica dispersion of the present invention in which a concentration of dissolved silicic acid is controlled to 200 ppm or less produces a very small amount of coagulated matters or scarcely produces them when blended with a binder. Accordingly, a step for controlling a concentration of dissolved silicic acid described above is allowed to intervene between a dispersing step for producing the cationized silica dispersion and a binder blending step for adding the binder to the cationized silica dispersion to produce a coating composition, whereby a continuous production line for the coating composition containing substantially no coagulated matters can be established.

Thus, according to the present invention, provided is as well a production process for a coating composition, characterized by comprising a dispersing step for dispersing dry processed silica and a cationic resin in a polar solvent to obtain a cationized silica dispersion and a binder blending step for blending the cationized silica dispersion obtained at the above dispersing step with a binder, wherein a dissolved silicic acid concentration-controlling step for controlling a concentration of dissolved silicic acid at 25° C. contained in the cationized silica dispersion to 200 ppm or less in terms of $SiO_2$ is further interposed between the dispersing step and the binder blending step each described above.

In the process described above, employment of the ion exchange operation previously described in the step for controlling a concentration of dissolved silicic acid contained in the cationized silica dispersion makes it possible to lower the above dissolved silicic acid concentration for very short time, so that the production efficiency can be elevated.

In the production process for a coating composition described above, various publicly known binders described above can be used for the binder used at the binder blending step. The specific examples thereof shown in further details include cellulose derivatives such as methyl cellulose, carboxymethyl cellulose and hydroxyethyl cellulose; polyvinyl alcohol and derivatives thereof; polyalcohols obtained by reducing polyketones comprising carbon monoxide-ethylene base copolymers; starches such as oxidized starch, etherified starch and dextrin; polyvinylpyrrolidone; polyacrylic acid, polymethacrylic acid, esters thereof and salts thereof, copolymers of these various and polymers obtained by modifying these various polymers with functional groups such as a carboxyl group and a silyl group.

These binders may be blended directly with the cationized silica dispersion or may be dissolved or dispersed in advance in a polar solvent and then blended with the cationized silica dispersion.

A blend proportion of the binder to silica shall not specifically be restricted and is recommendable to fall in a range where the characteristics of the coating layer obtained from the coating composition are satisfied.

A publicly known method can be applied to a method for blending the cationized silica dispersion with the binder without any specific restrictions, and it can be carried out by means of a high-speed rotation shearing type stirrer such as a homogenizer and a homomixer as well as conventional stirrers having propeller blades or turbine blades.

As understood from the descriptions given above, the cationized silica dispersion of the present invention makes it possible to control coagulated matters produced in producing the coating composition to a very low level and therefore can advantageously be used for producing a coating composition for providing a coated article with a gas barrier property, a corrosion resistance, a hydrophilic property, a glossiness and a liquid absorbing property. The above coating composition makes it possible to stably form a coating layer which is excellent in transparency and homogeneity.

The specific uses of the coating composition described above include coating compositions for gas barrier, coating compositions for corrosion prevention and coating compositions for ink jet recording paper.

EXAMPLES

The present invention shall specifically be explained with reference to the examples of the present invention, but the present invention shall by no means be restricted by these examples.

Measured respectively by the following methods were a concentration of dissolved silicic acid contained in the cationized silica dispersion, an n value of the above dispersion and a stability of the coating composition formed from the above dispersion.

(1) Measurement of a Concentration of Dissolved Silicic Acid Contained in the Cationized Silica Dispersion Dissolved in ion-exchanged water were 10 g of hexaammonium heptamolybdate tetrahydrate and 4.7 g of 28% aqueous ammonia, and then water was added thereto to prepare 100 ml of a molybdic acid solution. Blended were 2.0 g of 1.5N sulfuric acid, 6.5 g of ion-exchanged water and 0.50 g of a cationized silica dispersion sample, and centrifugal separation was carried out immediately after blending to remove suspended matters. The molybdic acid solution was added to a supernatant obtained after the centrifugal separation in a proportion of 1.0 g per 9.0 g of the supernatant to react them at 25° C. for 5 minutes, and then the absorbance in 410 nm was measured. A concentration of dissolved silicic acid contained in the cationized silica dispersion sample was determined by applying this absorbance to a calibration curve prepared in advance for a sample having a known concentration of dissolved silicic acid.

(2) Measurement of an n Value of the Cationized Silica Dispersion

The cationized silica dispersion was diluted with ion-exchanged water so that the silica concentration was 1.5% by weight, and an absorbance ($\tau$) of the above diluted dispersion was measured in a wavelength ($\lambda$) falling in a range of 460 to 700 nm. Then, log ($\tau$) was plotted to log ($\lambda$) to determine a gradient ($-n$) of the straight line according to a least square method.

(3) Stability Test of the Coating Composition Prepared from the Cationized Silica Dispersion A solution containing 6.0 parts by weight of methyl cellulose as a binder in terms of a solid matter was mixed with 100 parts by weight of the cationized silica dispersion containing silica in terms of a solid matter to thereby prepare a coating composition (binder blending step). The resulting coating composition was diluted with ion-exchanged water so that a concentration of silica was 1.0% by weight, and a transmittance of the above diluted coating composition was measured. In this measurement, set respectively were the optical path length to 10 mm and the measuring wavelength to 700 nm. Further, in order to evaluate the reproducibility of the physical properties of the coating composition, a standard deviation in repeating ten times the same test was determined.

Example 1 and Comparative Example 1

Fumed silica having a specific surface area of 300 $m^2/g$ (Reolosil QS-30, manufactured by Tokuyama Corporation) was mixed with ion-exchanged water, and the mixture was subjected to dispersion treatment by means of a homogenizer (Ultra-Turrax T-50, manufactured by Ika Co., Ltd.) to thereby obtain a silica dispersion having a silica content of 20% by weight. This solution is hereinafter called a dispersion-A.

Next, the dispersion-A described above containing 100 parts by weight of silica in terms of a solid matter was mixed with a cationic resin solution containing 3.0 parts by weight of a diallyldimethylammonium chloride polymer in terms of a solid matter, and the mixture was subjected to dispersion treatment by means of the same homogenizer as described above. When both were mixed, gelation was caused, but strong stirring turned it into a slurry having fluidity. This solution is hereinafter called a dispersion-B.

This dispersion-B was passed once through an orifice at a treating pressure of 800 kgf/cm² by means of a high pressure homogenizer (Nanomizer LA-30, manufactured by Nanomizer Inc.) to thereby obtain a cationized silica dispersion for comparison (Comparative Example 1).

Further, the cationized silica dispersion obtained in the manner described above was mixed with a strong base anion exchange resin of an acetic acid group type, and the mixture was stirred for 10 minutes by means of a propeller mixer, followed by removing the ion exchange resin, whereby the cationized silica dispersion of the present invention was obtained (Example 1).

The cationized silica dispersion thus obtained was measured for a dissolved silicic acid concentration, a light scattering index (n value) and a stability of the coating composition respectively. The results thereof are shown in Table 1.

Example 2 and Comparative Example 2

The same procedure as in Comparative Example 1 was repeated to obtain a cationized silica dispersion for comparison (Comparative Example 2), except that fumed silica having a specific surface area of 200 m²/g (Reolosil QS-102, manufactured by Tokuyama Corporation) was used.

Further, the cationized silica dispersion obtained in the manner described above was mixed with the strong base anion exchange resin of an acetic acid group type, and the mixture was stirred for 10 minutes by means of the propeller mixer, followed by removing the ion exchange resin, whereby the cationized silica dispersion of the present invention was obtained (Example 2).

The cationized silica dispersion thus obtained was measured for a dissolved silicic acid concentration, a light scattering index (n value) and a stability of the coating composition respectively. The results thereof are shown in Table 1.

Example 3 and Comparative Example 3

The same procedure as in Comparative Example 1 was repeated to obtain a cationized silica dispersion for comparison (Comparative Example 3), except that 5 parts by weight of the cationic resin was mixed with 100 parts by weight of dry processed silica.

Further, the cationized silica dispersion obtained in the manner described above was mixed with the strong base anion exchange resin of an acetic acid group type, and the mixture was stirred for 10 minutes by means of the propeller mixer, followed by removing the ion exchange resin, whereby the cationized silica dispersion of the present invention was obtained (Example 3).

The cationized silica dispersion thus obtained was measured for a dissolved silicic acid concentration, a light scattering index (n value) and a stability of the coating composition respectively. The results thereof are shown in Table 1.

Example 4 and Comparative Example 4

The same procedure as in Comparative Example 1 was repeated to obtain a cationized silica dispersion for comparison (Comparative Example 4), except that a concentration of silica was changed to 15% by weight.

Further, the cationized silica dispersion obtained in the manner described above was mixed with the strong base anion exchange resin of an acetic acid group type, and the mixture was stirred for 10 minutes by means of the propeller mixer, followed by removing the ion exchange resin, whereby the cationized silica dispersion of the present invention was obtained (Example 4).

The cationized silica dispersion thus obtained was measured for a dissolved silicic acid concentration, a light scattering index (n value) and a stability of the coating composition respectively. The results thereof are shown in Table 1.

Example 5 and Comparative Example 5

The same procedure as in Comparative Example 4 was repeated to obtain a cationized silica dispersion for comparison (Comparative Example 5), except that a diallyldimethylammonium chloride-acrylamide copolymer was used as the cationic resin and that 5 parts by weight of the above cationic resin was mixed with 100 parts by weight of dry processed silica.

Further, the cationized silica dispersion obtained in the manner described above was mixed with the strong base anion exchange resin of an acetic acid group type, and the mixture was stirred for 10 minutes by means of the propeller mixer, followed by removing the ion exchange resin, whereby the cationized silica dispersion of the present invention was obtained (Example 5).

The cationized silica dispersion thus obtained was measured for a dissolved silicic acid concentration, a light scattering index (n value) and a stability of the coating composition respectively. The results thereof are shown in Table 1.

Example 6

A solution of the diallyldimethylammonium chloride polymer was mixed with the strong base anion exchange resin of an acetic acid group type, and the mixture was stirred for 60 minutes by means of the propeller mixer, followed by removing the ion exchange resin. The same procedure as in Comparative Example 1 was repeated to obtain the cationized silica dispersion of the present invention, except that a solution of the cationic resin thus ion-exchanged was used.

The cationized silica dispersion thus obtained was measured for a dissolved silicic acid concentration, a light scattering index (n value) and a stability of the coating composition respectively. The results thereof are shown in Table 1

Example 7 and Comparative Example 6

The same tests as in Example 1 and Comparative Example 1 were carried out, except that in the stability test of the coating composition, a solution containing 50 parts by weight of polyvinyl alcohol (PVA-120, manufactured by Kuraray Co., Ltd.) per 100 parts by weight of silica was used as a binder solution. The results thereof are shown in Table 1 as Example 7 and Comparative Example 6.

TABLE 1

|  |  | Cationized silica dispersion | | Stability of coating composition* | |
|---|---|---|---|---|---|
|  |  | Silicic acid concentration (ppm) | n value | Transmission factor (%) | Standard deviation (%) |
| Example | 1 | 170 | 3.5 | 49 | 1.9 |

TABLE 1-continued

|  |  | Cationized silica dispersion | | Stability of coating composition* | |
|---|---|---|---|---|---|
|  |  | Silicic acid concentration (ppm) | n value | Transmission factor (%) | Standard deviation (%) |
|  | 2 | 170 | 3.4 | 42 | 1.6 |
|  | 3 | 180 | 3.5 | 53 | 1.8 |
|  | 4 | 170 | 3.5 | 49 | 1.8 |
|  | 5 | 160 | 2.7 | 37 | 2.1 |
|  | 6 | 170 | 3.5 | 51 | 1.9 |
|  | 7 | 170 | 3.5 | 61 | 1.9 |
| Comparative Example | 1 | 310 | 3.5 | 11 | 7.7 |
|  | 2 | 320 | 3.4 | 15 | 6.8 |
|  | 3 | 350 | 3.5 | 15 | 6.1 |
|  | 4 | 310 | 3.5 | 12 | 7.5 |
|  | 5 | 300 | 2.7 | 6 | 5.5 |
|  | 6 | 310 | 3.5 | 15 | 7.1 |

*Composition obtained by mixing each cationized silica dispersion with the binder solution in the proportion described above.

As can be found from the results shown in Table 1, the cationized silica dispersions of the present invention obtained in Examples 1 to 7 have a low concentration of dissolved silicic acid. Further, it can be found as well from the results shown in Table 1 that when the above dispersion is mixed with a binder solution to prepare a coating composition, coagulated matters are not produced and that a coating composition which is homogeneous and has a high transparency is obtained with good. Further, the same stability as those of the coating compositions shown in Table 1 has been confirmed as well in coating compositions obtained by blending the cationized silica dispersions obtained in Examples 1 to 7 with the solutions of binders other than methyl cellulose and polyvinyl alcohol.

According to the results shown in Table 1, it can be found that the cationized silica dispersions for comparison obtained in Comparative Examples 1 to 6 have a high concentration of dissolved silicic acid and that when blended with the binder solutions, a large amount of coagulated matters is produced to provide cloudy coating compositions.

What is claimed is:

1. A cationized silica dispersion prepared by dispersing dry processed silica and a cationic resin in a polar solvent, wherein a concentration of dissolved silicic acid at 25° C. contained in the above dispersion is 200 ppm or less in terms of $SiO_2$.

2. The cationized silica dispersion as described in claim 1, wherein the dry processed silica has a specific surface area of 50 $m^2/g$ or more which is determined by a BET method.

3. The cationized silica dispersion as described in claim 1, wherein a light scattering index is 2.0 or more.

4. The cationized silica dispersion as described in claim 1, wherein it contains 1 to 50 parts by weight, per 100 parts by weight of the dry processed silica, of the cationic resin.

5. A production process for a cationized silica dispersion, wherein in dispersing dry processed silica and a cationic resin in a polar solvent to produce a cationized silica dispersion, a concentration of dissolved silicic acid contained in the cationized silica dispersion at 25° C. is measured and controlled to 200 ppm or less in terms of $SiO_2$.

6. The production process for a cationized silica dispersion as described in claim 5, wherein the above cationized silica dispersion is brought into contact with an anion exchange resin to thereby control the dissolved silicic acid concentration.

7. The production process for a cationized silica dispersion as described in claim 5, wherein the cationized silica dispersion contains 1 to 50 parts by weight, per 100 parts by weight of the dry processed silica, of the cationic resin.

8. A production process for a coating composition, comprising a dispersing step for dispersing dry processed silica and a cationic resin in a polar solvent to obtain a cationized silica dispersion and a binder blending step for blending the cationized silica dispersion obtained at the above dispersing step with a binder, wherein a dissolved silicic acid concentration-controlling step for controlling a concentration of dissolved silicic acid at 25° C. contained in the cationized silica dispersion to 200 ppm or less in terms of $SiO_2$ is further interposed between the dispersing step and the binder blending step each described above.

9. The production process for a coating composition as described in claim 8, wherein the above cationized silica dispersion is brought into contact with an anion exchange resin to thereby control the dissolved silicic acid concentration.

10. The production process for a cationized silica dispersion as described in claim 8, wherein the cationized silica dispersion contains 1 to 50 parts by weight, per 100 parts by weight of the dry processed silica, of the cationic resin.

* * * * *